Patented Apr. 11, 1950

2,503,699

UNITED STATES PATENT OFFICE 2,503,699

POLYALLYL ACETOXYACETATE

David E. Adelson and Hans Dannenberg, Berkeley, Calif., assignors to Shell Development Company, San Francisco, Calif., a corporation of Delaware No Drawing. Application May 27, 1946, Serial No. 672,702

5 Claims. (Cl. 260—78.3)

This invention relates to a class of useful new polymers and to a method for manufacturing them. More particularly, the invention pertains to polyallyl esters of acyloxy- or ester-substituted monocarboxylic acids, e. g. polyallyl acetylglycolate.

Diallyl esters of dicarboxylic acids can be subjected to polymerization treatment whereby polymers of the esters are obtained. However, monomers of such esters contain two polymerizable unsaturated groups, i. e. two allyl groups, and consequently, they polymerize to form three-dimensional cross-linked polymers which are characterized by being insoluble in all solvents as well as being infusible. These insoluble and infusible polymers have no utility in applications where further processing of the polymer is desired because of the inability to dissolve them in solvents and subject them to further reaction treatment. On the other hand, compounds which contain but a single polymerizable unsaturated group do not form three-dimensional cross-linked polymers upon being polymerized; rather, they form only linear polymers which are characterized by being soluble in a variety of common solvents as well as being fusible, i. e. capable of being melted when heated. The properties of solubility and fusibility possessed by linear polymers of the compounds containing only a single polymerization unsaturated group enable them to be subjected to further treatment and reaction so as to produce highly useful products. Moreover, the linear polymers are useful themselves without further treatment owing to the properties of solubility and fusibility.

Allyl esters are extremely resistant to polymerization treatment in comparison with other compounds containing a polymerizable unsaturated group. For example, vinyl acetate will form a polymer upon addition of a polymerization catalyst like benzoyl peroxide in a short time even at room temperature (20° C.). The corresponding allyl ester, i. e. allyl acetate, can have benzoyl peroxide added thereto and permitted to remain at room temperature for practically indefinite periods of time without appreciable polymerization occurring. In our copending application, Serial No. 417,278, filed October 31, 1941, now abandoned, of which the present application is a continuation-in-part, we have described a method whereby polymerization of allyl acetate and similar singly unsaturated compounds can be effected. As disclosed therein, we discovered that by heating liquid allyl acetate for rather extended periods of time at elevated temperatures of 50° C. to 250° C. in the presence of peroxides or gases containing oxygen, polymerization of the allyl acetate occurred and polyallyl acetate was produced. Besides being catalysts which are capable of effecting the polymerization reaction, the substances used in the treatment such as benzoyl peroxide or air, are also known to be powerful oxidizing agents. A compound like allyl acetate is not particularly susceptible to oxidation owing to its stable chemical structure. Treatment of it at elevated temperature in the presence of a peroxide or gaseous oxygen should not, and in fact does not, cause oxidation thereof, at least to any appreciable extent. The situation is quite different with respect to allyl esters of acylated hydroxy-substituted monocarboxylic acids of which allyl acetylglycolate is typical. It is known that the alpha carbon atom in the glycolate portion of saturated esters of acetylglycolic acid contains hydrogen atoms which are made reactive by the proximity of the carbonyl group of the ester. This reactivity is much more pronounced, owing to the presence of the second ester group, than is the case with an unsubstituted ester like ethyl acetate. It would be expected that treatment of allyl acetylglycolate with oxidizing agents like air or peroxides, especially at elevated temperatures would cause oxidation to occur at the point of this labile alpha-methylene group. It was therefore unexpected when we discovered that allyl acetylglycolate could be heated at elevated temperatures in the presence of a peroxide or air and polyallyl acetylglycolate produced with no material oxidation of the compound having occurred.

The compounds polymerized in the process of the present invention are preferably allyl esters of saturated acylated glycolic acid such as allyl esters of acids like formylglycolic, acetylglycolic, propionylglycolic, butyrylglycolic, isobutyrylglycolic, caproylglycolic, diethylacetylglycolic, caprylglycolic, myristylglycolic, palmitylglycolic, stearylglycolic, behenylglycolic and the like. The acids which are acylated to the hydroxy-substituted monocarboxylic acids in the esters are saturated fatty acids. If desired, polymerization can be effected with allyl esters of acylated homologues of glycolic acid wherein the saturated monoacyl radical is substituted for the hydrogen atom of the hydroxyl group linked to the alpha carbon atom of the monocarboxylic acid as is the case, for example, with allyl ester of acids like alpha-acetoxypropionic, alpha-propionoxypropionic, alpha - butyroxypropionic, alpha - valeroxypropionic, alpha - caproxypropionic, al - pha-palmitoxypropionic, alpha-formoxybutyric, alpha - acetoxybutyric, alpha - butyroxybutyric, alpha - pelargonoxybutyric, alpha - acetoxyiso - butyric, alpha-acetoxycaprylic, alpha-propion-oxycapric, alpha-acetoxystearic, and the like together with their homologues. A less preferred class of esters are those wherein the saturated acyloxy radical is substituted on a more removed carbon atom of the monocarboxylic acid than the alpha carbon atom. Reference is made to allyl esters of such representative acids as beta-acetoxypropionic, beta - acetoxybutyric, beta - acetoxyisobutyric, beta-acetoxyisocaproic, beta-propionoxypropionic, beta - valeroxypropionic, beta - butyroxycaproic, gamma - acetoxyvaleric, gamma-stearoxyvaleric, epsilon-acetoxycaproic, 10-acetoxyundecylic, 9-acetoxystearic, 9-butyroxystearic, 13-acetoxybehenic and the like together with their homologues. It may be desirable in some cases to polymerize allyl esters of monocarboxylic acids which contain a plurality of acyloxy substituents linked to the monocarboxylic acid like for example with diacetoxypropionic acid, beta,gamma - diacetoxybutyric acid, gamma,delta-dipropionoxyvaleric acid, diacetoxystearic acid, triacetoxybutyric acid and the like together with their homologues.

The allyl esters polymerized in the process of the invention are esters of a saturated aliphatic monocarboxylic acid, which acid contains one or more saturated aliphatic monoacyloxy substituents linked thereto. The substituent or substituents linked to the acid are acyloxy radicals which are contained in saturated fatty monocarboxylic acids. The acyloxy substituted acids can contain any number of carbon atoms provided that the monocarboxylic acid containing the acyloxy substituent has at least 2 carbon atoms. However, esters of certain acids are preferred. These preferred allyl esters are represented by the formula

wherein $R_1$ is a hydrogen atom or an alkyl radical of not more than 10 carbon atoms, most preferably being an alkyl radical of 1 to 3 carbon atoms, and $R_2$ is a saturated divalent aliphatic hydrocarbon radical of 1 to 10 carbon atoms, most preferably containing 1 to 5 carbon atoms.

These allyl esters polymerize at a reasonably rapid rate in the process of the invention. However, the corresponding esters of other unsaturated alcohols of the same type can also be used although polymerization of them, in general, is slower and more difficult. These alcohols are monoolefinic monohydric compounds, all of which contain the aliphatic olefinic double bonded linkage between the second and third carbon atoms from the oxygen atom of the hydroxy group therein. In other words, the alcohols have an olefinic linkage between two aliphatic carbon atoms one of which is directly linked to the saturated carbon atom having the hydroxy group linked directly thereto. These alcohols can be either primary, secondary or tertiary alcohols and they contain 3 to 10 carbon atoms. The alcohols may also be termed beta,gamma-monoolefinic monohydroxy alcohols in that they contain the aliphatic olefinic linkage between the beta and gamma carbon atoms with respect to the alpha carbon atoms to which the hydroxy group is directly linked. Of the generic class of alcohols employed in the form of their esters with the acyloxy substituted acids, it is preferred that the gamma or third carbon atom from the oxygen atom of the hydroxy group be the carbon atom of a terminal methylene group as is the case in such representative alcohols as allyl, methallyl, beta-ethallyl, methyl vinyl carbinyl, ethyl vinyl carbinyl, dimethyl vinyl carbinyl, beta-isopropyl allyl, beta-hexyl allyl, pentyl vinyl carbinyl, phenyl vinyl carbinyl, beta-phenyl allyl, tolyl vinyl carbinyl, beta-cyclohexyl allyl, and the like. If desired, the esters of other less preferred alcohols of the class can be used such as, for example, crotyl alcohol, tiglyl alcohol, angelyl alcohol, cinnamyl alcohol, hexen-2-ol-1, octen-2-ol-1, decen-2-ol-1, hexen 3-ol-2, hexen 4-ol-3, cyclohexen-2-ol-1, and the like. Esters of the aliphatic unsaturated alcohols are most desirable, but those containing aryl and/or alicyclic radicals, e. g. tolyl, cyclohexyl, and cyclopentyl as additional substituents, can also be used. If desired, the esters of halogen-substituted alcohols can also be employed such as beta-chlorallyl alcohol, gamma-chlorallyl alcohol, beta-bromallyl alcohol, chlorocrotyl alcohol, 3-chlorobuten-2-ol-1 and the like.

In its broad aspect, our invention is concerned with polymerization of and polymers from allyl and related unsaturated alcohol esters of a saturated aliphatic monocarboxylic acid containing at least 2 carbon atoms and containing a saturated aliphatic monoacyloxy substituent linked directly to a carbon atom of the monocarboxylic acid. The esters contain but a single polymerizable group having a multiple linkage between two vicinal aliphatic carbon atoms. The only group present in the esters capable of addition polymerization is contained in the alcohol portion of the esters. This lack of plurality of such polymerizable groups enables the desired linear polymers to be obtained.

The monomeric esters may be prepared by reacting the unsaturated alcohol ester of the corresponding hydroxy substituted monocarboxylic acid with the appropriate carboxylic acid anhydride. This reaction is effected by heating the reactants at about 75° C. to 100° C. If desired, 1% to 5% of phosphoric or toluenesulfonic acid as catalyst can be used. An example of this method of preparation is the reaction of acetic anhydride with allyl glycolate whereby allyl acetoxyacetate is obtained. In some cases, the carboxylic acid rather than the acid anhydride can be employed although this necessitates removal of the water of reaction which can be effected in conventional manner used in preparing esters in general. The hydroxy substituted esters employed as reactant are obtained by esterifying the unsaturated alcohol with the hydroxy substituted acid, preferably employing toluenesulfonic acid as catalyst. If desired, the acyloxy acid esters polymerized in the invention can be prepared by a different method. The hydroxy substituted monocarboxylic acid is reacted with the acid chloride of the fatty acid desired to be present as acyloxy substituent and in this way the acyloxy substituted monocarboxylic acid is obtained. This acid is then treated with thionyl chloride whereby it is converted to the acid chloride. The acid chloride is then added in small portions with stirring to the unsaturated alcohol and the reaction product is the desired unsaturated alcohol ester of the acyloxy substituted monocarboxylic acid. For example, methallyl beta-propionoxypropionate is prepared by reacting propionyl chloride with hydracrylic acid. The resulting beta-propionoxypropionic acid is separated from the reaction mixture, preferably by crystallization from benzene. The acid is then contacted with thionyl chloride and the mixture is heated at 50° C. to 60° C. to drive off sulfur dioxide and hydrogen chloride. The resulting acid chloride is recovered by distillation in vacuo and slowly added to agitated methallyl alcohol. The reaction mixture is heated and the ester separated and purified by distillation in vacuo.

In order to obtain the linear polymers of the invention, the unsaturated esters are heated in the presence of an oxygen-containing polymerization catalyst. Gases which contain oxygen such as air can be used for this purpose or, if desired, substantially pure oxygen is suitable as well as oxygen in admixture with diluents like nitrogen, carbon dioxide or methane. Peroxide polymerization catalysts are very suitable such as benzoyl peroxide, hydrogen peroxide, barium peroxide, sodium peroxide, olefin peroxide, lauryl peroxide, benzoyl acetyl peroxide, acetone peroxide, etc. Tertiary alkyl peroxides are particularly preferred in view of their high catalytic activity. These peroxides include such compounds as, for example, tert-butyl hydroperoxide, di-tert-butyl peroxide, di-tert-amyl peroxide and tert-butyl perbenzoate. Other oxygen-yielding compounds can be employed as catalysts such as an alkali metal persulfate or perborate. All of these suitable oxygen-containing polymerization catalysts have therein an oxygen atom linked directly to another oxygen atom.

Elevated temperatures are necessary in order to effect the desired polymerization. The ester in the presence of the polymerization catalyst is heated at a temperature between about 50° C. and about 200° C. and in some cases up to 300° C. or even higher. However, temperatures so high that appreciable decomposition of the ester or its polymer are, of course, to be avoided. The rate of polymerization at lower temperatures such as from 50° C. to 100° C. is comparatively slow although with catalysts like benzoyl peroxide which are subject to extensive decomposition at higher temperatures, it is desirable to employ a temperature within this lower range. The tertiary alkyl peroxides are quit stable at such higher temperatures and by employing a range of say 100° C. to 250° C., 150° C. to 225° C. being particularly suitable, with a catalyst of this type, e. g. ditertiary butyl peroxide, the polymerization can be effected at a rapid rate. The concentration of catalyst can be varied over considerable limits and it seems in general that larger amounts of catalyst give faster rates of polymerization. However, this effect is to some extent limited because above about 10%, the increase in rate with increased catalyst concentration is not so marked as at lower amounts of the oxygen-yielding compounds. The use of excessive amounts of polymerization catalyst is therefore uneconomical. In general, the use of about 0.1% to 5% polymerization catalyst is suitable and about 1% to 2% is preferred. To effect the addition polymerization reaction, the oxygen-containing catalyst is, of course, the sole catalytic agent present in the polymerizing mixture. The polymerization appears to occur in the liquid phase and the pressure of operation is therefore regulated in conjunction with the temperature so that at least part of the ester is in liquid phase, i. e. where necessary sufficiently high pressure is employed so that all or part of the ester is maintained in liquid phase. With peroxide catalysts like benzoyl peroxide, which are subject to considerable decomposition at temperatures above 100° C., the polymerization can be effected by adding additional catalyst from time to time or continuously in order that the polymerizing ester will always have the polymerization catalyst present. If desired, of course, the temperature may be maintained below that at which appreciable decomposition of the catalyst occurs. In any event, it is essential that the catalyst be present with liquid reactant to enable the polymerization to proceed at least at an appreciable rate.

As noted, the polymerization may be effected in the presence of a molecular oxygen-containing gas. When such a gas is employed as catalyst it is ordinarily desirable to operate at temperatures from about 100° C. to 200° C. In this case, the ester is heated and a molecular oxygen-containing gas such as air is brought into intimate contact with the liquid ester as by dispersing the gas into and through the reaction mixture in the form of fine bubbles.

The process of the invention may be executed in a variety of manners. In general, it is preferable to conduct the polymerization in a closed vessel equipped with heating means. When a non-gaseous catalyst is employed, the catalyst is mixed with the ester and the mixture is heated for a time sufficient to effect the appreciable polymerization of the ester. In cases where a gaseous catalyst is used, the gas is bubbled or dispersed through the heated liquid ester, and recycled through the ester, or if desired, discharged to the atmosphere. It is usually desirable in discharging gaseous catalyst, to provide passage of the gas through some recovery means such as a condenser in order to remove ester which is carried with the gas as vapor. The time required to effect the polymerization will vary to considerable extent depending upon the particular ester, the catalyst and the temperature of operation. It has been found in polymerizing the esters that the rate of polymerization is fairly rapid at first but, as the monomeric ester is diluted with polymer, the rate decreases. In general, the polymerization is conducted for a time sufficient to effect appreciable polymerization, i. e. until at least 10% of the ester has been converted to polymer.

The time necessary to convert a given proportion of polymer will vary considerably with the particular ester, the catalyst and its concentration, the temperature and other reaction variables. The time required to obtain a desired proportion of polymer is readily determined by trial under the chosen reaction conditions wherein samples are withdrawn and the refractive index thereof measured after which the sample is subjected to a rapid distillation under vacuum of 1 to 2 mm. to remove monomer and determine the polymer content thereof. Since the refractive index of the monomer-polymer mixture increases with increasing polymer content, a correlation can be made between time of treatment, refractive index and the conversion to polymer. By use of the correlation, the time necessary for a desired conversion can be predicted or by measuring the refractive index of a polymerizing ester, the polymer content can be estimated.

While it is usually preferable to use substantially pure ester, it may in some cases be desirable to effect the polymerization in an inert solvent, especially in those cases where the ester is a solid material at the temperature of operation. Various hydrocarbons are particularly suited for this purpose such as benzene, toluene, naphtha and the like. Many of the esters are high boiling liquids and they can be polymerized at normal atmospheric temperature by refluxing in the presence of the polymerization catalyst.

In polymerizing the esters, the polymerization reaction is ordinarily stopped before all the monomer has been converted to polymer. The unreacted monomer is then recovered from the reaction mixture, preferably by distillation or evaporation. Other methods, such as extraction or the like, can be used to separate the monomer from the polymer. The recovered unreacted monomer may be reutilized in further polymerization operations.

The polymeric esters of the invention are preferably prepared by direct polymerization of the appropriate unsaturated alcohol ester of the acyloxy substituted monocarboxylic acid. If desired, the polymers can be prepared by an indirect method. The unsaturated alcohol ester of the corresponding hydroxy substituted monocarboxylic acid is subjected to the same conditions of polymerization as described herein. The unpolymerized monomer is removed from the addition polymer and the latter is then reacted with the fatty acid anhydride. This reaction is effected by heating the polymer with an excess of the anhydride and evaporating or distilling off the fatty acid liberated by the reaction whereby the desired polymer remains. For example, allyl alpha-acetoxyisobutyrate is obtained by polymerizing allyl alpha-hydroxyisobutyrate in the presence of 2% di-tert-amyl peroxide at about 200° C. The monomer is distilled from the mixture and acetic anhydride in 20% excess is added to the polyallyl alpha-hydroxyisobutyrate. The mixture is heated at about 100° C. until the reaction is complete and the volatile materials are distilled off. The product is polyallyl alpha-acetoxyisobutyrate.

For the purpose of further illustrating in some detail the application of the invention as described above the following examples are given, although it is to be understood that these are in no way to be construed as limiting the invention with respect to reactants, catalysts or mode of operation.

*Example I*

In a flask fitted with a reflux condenser, about 500 g. of acetyl chloride was mixed with about 250 g. of glycolic acid whereupon a violent reaction ensued with evolution of much hydrochloric acid. When the reaction had subsided, the mixture was heated at 70° C. to 80° C. for 3 hours after which excess acetyl chloride was evaporated. The residue was dissolved in and crystallized from benzene. About 319 g. of acetylglycolic acid melting at 61° C. to 63° C. was obtained. About 300 g. of the acetylglycolic acid was mixed with 400 g. of thionyl chloride ($SoCl_2$) and the mixture heated at 50° C. to 60° C. until evolution of sulfur dioxide and hydrogen chloride ceased. The mixture was distilled and about 258 g. of acetylglycolyl chloride boiling at 52° C. to 56° C. under 9 to 11 mm. pressure was recovered. About 46.4 g. of allyl alcohol was placed in a flask and 110 g. of the acetylglycolyl chloride was added dropwise. An instantaneous exothermic reaction occurred and, after allowing the mixture to stand overnight, it was heated for one hour at 80° C. to 90° C. while blowing nitrogen therethrough to remove hydrogen chloride. The remainder of the hydrogen chloride was removed by heating the mixture at 40° C. to 50° C. at 10 to 15 mm. pressure, after which the residue was distilled and about 37.9 g. of allyl acetylglycolate was recovered which boiled at 101.5° C. to 102° C. at 20 to 21 mm. The ester analyzed as follows:

|  | Found | Calculated |
|---|---|---|
| Specific gravity, 20/4 | 1.104 |  |
| Refractive index, 20/D | 1.4318 |  |
| Carbon, per cent | 52.4 | 53.1 |
| Hydrogen, per cent | 6.4 | 6.3 |
| Acidity, equiv. per 100 g | 0.041 | 0 |
| Ester value, equiv. per 100 g | 1.22 | 1.265 |

*Example II*

Allyl acetylglycolate was mixed with about 2% benzoyl peroxide and heated at 80° C. for 31 hours, at which time an additional 1% of benzoyl peroxide was added and the heating continued for a total time of 52 hours. During the heating, the material became increasingly viscous. The mixture of monomer and polymer dissolved in acetone, and the polymer precipitated upon the addition of methyl alcohol, water or isopropyl alcohol to the solution. Polyallyl acetylglycolate, which was separated by adding methyl alcohol to an acetone solution of the monomer-polymer mixture, was a very viscous, transparent substance.

The polyallyl acetylglycolate was dissolved in an equal weight of chlorobenzene and 2% of benzoyl peroxide, based on the polymer, was added. The solvent was evaporated from the solution and the film of polymer residue heated at about 120° C. for 13 hours. The viscosity of the polymer increased during the treatment so that a non-flowing product at room temperature was obtained. The treated polymer was again dissolved in an equal weight of dioxane, and 1% of benzoyl peroxide, based on the polymer, was added to the solution. The solvent was evaporated and a thin film of the polymer containing the catalyst was heated for 18 hours at about 120° C. The final product remained thermoplastic although the viscosity of the polymer had increased markedly by the foregoing treatment in the presence of the peroxide polymerization catalyst. The final polymer was a liquid at about 120° C. and a sticky, non-flowing solid at room temperature.

*Example III*

Polyallyl acetylglycolate was prepared by heating the monomeric ester at 125° to 130° C. while bubbling about 5 bubbles of air per minute therethrough. The material gradually increased in viscosity during the heating and measurements of refractive index, taken from time to time, also increased as indicated in the following table:

| Time, Hours | $n_D^{20}$ |
|---|---|
| 0 | 1.4318 |
| 24 | 1.4499 |
| 38 | 1.4563 |
| 51 | 1.4621 |
| 64 | 1.4653 |
| 84 | 1.4679 |
| 103 | 1.4691 |
| 122.5 | 1.4700 |

At the end of the above-indicated time, substantially all of the monomeric ester had been converted to polyallyl acetylglycolate. The product was a very viscous material.

Example IV

About 274 g. of allyl glycolate was mixed with 272 g. of acetic anhydride and the mixture heated in a still fitted with a fractionating column. After about 1¼ hours the theoretical amount of acetic acid had distilled off and the residue was then fractionated whereby allyl acetylglycolate boiling at 100° C. to 100.5° C. at 16 mm. pressure was recovered with a yield of about 75%. Analysis of the ester gave the following values:

|  | Found | Calculated |
|---|---|---|
| Refractive index, 20/D | 1.4304 | |
| Ester value, equiv. per 100 g | 1.268 | 1.265 |
| Acid value, equiv. per 100 g | 0.002 | 0 |
| Bromine No., g. Br per 100 g | 101 | 101 |

Example V

Allyl acetylglycolate was heated at reflux temperature of 206° C. for about 45 minutes during which time no appreciable polymerization thereof occurred. Then about 1% of di-tert-butyl peroxide was added and the heating continued for a total time of 105 minutes. In this period, the refractive index increased from 1.4304 to 1.4612. The monomer-polymer mixture was placed in a Claisen flask and monomeric ester distilled therefrom at a pressure of 1 to 2 mm. The residue, consisting of polyallyl acetylglycolate, was obtained in a 68.4% conversion. The polyallyl acetylglycolate was a very viscous liquid having a polymerization degree of about 7 as indicated by the ebullioscopic determination of molecular weight in toluene shown in the analysis given below.

|  | Found | Calculated |
|---|---|---|
| Refractive index, 20/D | 1.4762 | |
| Ester value, equiv. per 100 g | 1.245 | 1.265 |
| Acid value, equiv. per 100 g | 0.004 | 0 |
| Molecular weight | 1,100 | |

Example VI

Allyl acetylglycolate was refluxed at 206° C. for about 40 minutes in the presence of 1.2% di-tert-butyl peroxide. About 83% of the ester was converted to polymer having a refractive index (20/D) of 1.4761, a nearly water-white color of less than 1 on the Gardner scale, and a viscosity of greater than Z$_6$ on the Gardner-Holdt viscosity scale.

Example VII

Polyallyl glycolate was prepared by heating allyl glycolate at reflux temperature at 180° C. in the presence of 1.6% di-tert-butyl peroxide for one hour, after which the monomeric ester was removed from the polymer. About 1.21 equivalents of polyallyl glycolate was acetylated with 1.72 moles of acetic anhydride by heating at 100° C. for 2 hours after which the acetic acid and excess acetic anhydride was removed by distillation in vacuo. The resulting polyallyl acetylglycolate was obtained in 95.8% yield and was a viscous material like that obtained by direct polymerization of allyl acetylglycolate.

Example VIII

About 419 g. of allyl lactate containing 2 cc. of 85% phosphoric acid was heated to about 80° C. and 370 g. of acetic anhydride was added to the stirred solution at a rate sufficient to maintain the temperature at 95° C. to 100° C. After the addition was complete, the mixture was heated at 100° C. for an hour and then distilled giving about 484 g. of allyl acetyllactate boiling at 95.3° C. to 96.0° C. at 17 mm. Analysis of the product gave the following values:

|  | Found | Calculated |
|---|---|---|
| Refractive index, 20/D | 1.4270 | |
| Ester value, equiv. per 100 g | 1.162 | 1.163 |
| Acid value, equiv. per 100 g | 0.002 | 0 |
| Acetyl value, equiv. per 100 g | 0.003 | 0 |
| Bromine No., g. Br per 100 g | 92 | 93 |

Example IX

Allyl acetyllactate was refluxed at about 205° C. for 30 minutes but no appreciable polymerization occurred. Then di-tert-butyl peroxide dissolved in the ester was added during a 15 minute period so as to make a total concentration of about 1% peroxide. After the addition, the heating was continued for an additional 10 minutes whereupon the refractive index of the mixture was found to have increased from 1.4270 to 1.4590. Distillation of the mixture gave about 84.5% of polyallyl acetyllactate which was a clear, very viscous material having a polymerization degree of about 5.2 as indicated from the molecular weight determination made ebullioscopically in toluene. Analysis of the polymer is given below.

|  | Found | Calculated |
|---|---|---|
| Refractive index, 20/D | 1.4661 | |
| Color, Gardner | 1 | |
| Viscosity, Gardner-Holdt | Z$_8$ | |
| Ester value, equiv. per 100 g | 1.062 | 1.163 |
| Acid value, equiv. per 100 g | 0.003 | 0 |
| Molecular weight | 900 | |
| Bromine No., g. Br per 100 g | 19.6 | [1] 18 |

[1] Calculated from Mol. weight.

Example X

About 0.87 equivalent of polyallyl glycolate (obtained as described in Example VII) was heated with 1.31 moles of propionic anhydride at 100° C. with stirring. The heterogeneous mixture cleared after ½ hour and was heated for another 3½ hours. The volatile material was flash distilled from the mixture in vacuum. An additional 0.4 mole of anhydride was added and the heating continued for another 4 hours. Distillation of the product gave 95% of polyallyl propionylglycolate which was a very viscous liquid analyzing as follows:

|  | Found | Calculated |
|---|---|---|
| Refractive index, 20/D | 1.4751 | |
| Ester value, equiv. per 100 g | 1.146 | 1.163 |
| Acid value, equiv. per 100 g | 0.002 | 0 |
| Molecular weight, toluene | 1,300 | |

Example XI

Allyl acetylglycolate containing about 1% of di-tert-butyl peroxide was heated under nitrogen pressure for 20 minutes at about 255° C. Distillation of the monomer from the polymerization mixture indicated a conversion to polymer of 41.7%. Analysis of the polymer gave the following values:

|  | Found | Calculated |
|---|---|---|
| Refractive index, 20/D | 1.4728 |  |
| Ester value, equiv. per 100 g | 1.209 | 1.265 |
| Molecular weight, toluene | 755 |  |
| Bromine No., g. Br per 100 g | 22.2 | 121[1] |

[1] Calculated from Mol. weight.

The polymers of the invention are substantially non-volatile, very viscous liquid to semi-liquid materials. Contrary to expectations, the polymers proved to be excellent plasticizers for cellulose acetate. Neither polyallyl propionate, polyallyl butyrate, nor polyallyl caproate has properties which permit a homogeneous composition to be obtained when they are incorporated with either low acetyl cellulose (about 53% acetyl measured as acetic acid) or high acetyl cellulose (about 59% acetyl measured as acetic acid), the compositions containing about 40 parts of polymer per 100 parts of cellulose acetate which is a customary proportion of plasticizer to resin for satisfactory molding compositions used in the plastics industry. These polymers contain 3, 4 and 6 carbon atoms in the acid chain and they are incompatible with the cellulose acetate. It was therefore unexpected to find that polyallyl acetylglycolate containing 5 atoms, one of which is oxygen, in the acid chain had the unobvious property of giving homogeneous compositions with both high and low acetyl cellulose acetates, the proportion of polymer to resin again being 40 to 100. The resulting plastic composition containing the polymer of the invention was very suitable for molding operations. A test with polyallyl propionylglycolate demonstrated that it also gave a homogeneous composition with the high acetyl cellulose acetate. The lack of volatility of the polymers of the invention make them especially useful as plasticizers since they do not evaporate from the compositions even after extended periods of time.

The foregoing description has emphasized production of homopolymers, i. e. polymerization of the ester as sole polymerizable constituent in the composition although it may also contain the catalyst and inert diluents. If desired, copolymers can be prepared from mixtures of different esters, or from mixtures of the unsaturated ester and another compound containing a polymerizable group such as those containing the $CH_2=C$ or vinylidene group as in styrene, butadiene-1,3, vinyl acetate, diallyl phthalate, methyl methacrylate, allyl acetate, acrylonitrile, etc.

Copolymerization of an ester of the invention with another polymerization compound is illustrated by the following example:

Example XII

A mixture containing 25% of allyl glycolate and 75% of allyl acetylglycolate was refluxed at about 206° C. in the presence of 1.6% di-tert-butyl peroxide for ½ hour. Distillation of the monomeric esters from the mixture indicated about 87% conversion to copolymer which had the following properties:

| Refractive index, 20/D | 1.4730 |
|---|---|
| Color, Gardner | <1 |
| Viscosity, poises | 200 |

The novel linear polymers of the invention are very useful substances. They can be employed as plasticizers and softeners for various plastic materials such as cellulose derivatives like nitrocellulose, celluloseacetate, etc. as well as for synthetic resins and rubber. They are soluble in various common solvents such a lower aliphatic ketones and esters. This property of solubility enables important industrial uses for the polymers which is not possible for the thermoset insoluble infusible polymers known heretofore. Furthermore, the polymers do not have excessively high molecular weights which characterize polymers from some compounds. The polymer molecules from our products contain in general about 4 to 20 monomer units, that is, the degree of polymerization may be about 4 to 20 and is usually about 5 to 10.

We claim as our invention:

1. A process for the production of polyallyl acetoxyacetate which comprises heating allyl acetoxyacetate in liquid phase at a temperature between about 50° C. and 200° C. in the presence of a peroxide polymerization catalyst.

2. A process for the production of polyallyl acetoxyacetate which comprises heating allyl acetoxyacetate in liquid phase at about 100° C. to 200° C. while bubbling gaseous oxygen therethrough for a time sufficient to effect substantial polymerization of the ester.

3. Polyallyl acetoxyacetate.

4. Allyl acetoxyacetate.

5. A process for the production of polyallyl acetoxyacetate which comprises heating allyl acetoxyacetate in liquid phase at a temperature between about 50° C. and 200° C. in the presence of an oxygen-containing polymerization catalyst having an oxygen atom linked directly to another oxygen atom.

DAVID E. ADELSON.
HANS DANNENBERG.

REFERENCES CITED

The following references are of record in the file of this patent:

UNITED STATES PATENTS

| Number | Name | Date |
|---|---|---|
| 1,927,295 | Powers | Sept. 19, 1933 |
| 2,141,546 | Strain | Dec. 27, 1938 |
| 2,355,330 | Rehberg et al. | Aug. 8, 1944 |
| 2,410,551 | Rehberg et al. | Nov. 5, 1946 |